US010932266B2

(12) United States Patent
Lopez-Perez et al.

(10) Patent No.: US 10,932,266 B2
(45) Date of Patent: Feb. 23, 2021

(54) SHARING RESOURCES IN AN UNLICENSED FREQUENCY BAND (71) Applicant: Nokia Technologies Oy, Espoo (FI)

(72) Inventors: David Lopez-Perez, Dublin (IE); Lorenzo Galati Giordano, Dublin (IE); Giovanni Geraci, Dublin (IE); Andrea Bonfante, Dublin (IE)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 16/340,938

(22) PCT Filed: Oct. 12, 2017

(86) PCT No.: PCT/EP2017/076061
§ 371 (c)(1),
(2) Date: Apr. 10, 2019

(87) PCT Pub. No.: WO2018/069443
PCT Pub. Date: Apr. 19, 2018

(65) Prior Publication Data
US 2019/0230665 A1 Jul. 25, 2019

(30) Foreign Application Priority Data
Oct. 13, 2016 (EP) .................................. 16193756

(51) Int. Cl.
*H04B 7/0452* (2017.01)
*H04W 72/04* (2009.01)
(Continued)

(52) U.S. Cl.
CPC ...... *H04W 72/0453* (2013.01); *H04B 7/0617* (2013.01); *H04L 5/0073* (2013.01);
(Continued)

(58) Field of Classification Search
CPC . H04B 7/0617; H04B 7/0682; H04L 27/0006; H04L 5/001; H04L 5/0073;
(Continued)

(56) References Cited

U.S. PATENT DOCUMENTS 8,676,144 B2 * 3/2014 Guo ..................... H04B 17/345
375/346
8,718,560 B2 * 5/2014 Jin ....................... H04B 17/345
455/62

(Continued)

FOREIGN PATENT DOCUMENTS

JP  2012-524497 A   10/2012
JP  2015-228664 A   12/2015
(Continued)

OTHER PUBLICATIONS

Bonfante et al, Operating Massive MIMO in Unlicensed Bands for Enhanced Coexistence and Spatial Reuse, arXiv, 10 pages, Dec. 14, 2016.*
(Continued)

Primary Examiner — Frank Duong
(74) Attorney, Agent, or Firm — Fay Sharpe LLP (57) ABSTRACT A multiple input multiple output network node, an access network node, a computer program and method are disclosed. The method comprises prior to transmitting signals in an unlicensed band: estimating at least one channel within the unlicensed band between at least one access network node operable to transmit in the unlicensed band and the multiple input multiple output network node; determining precoding operations required to generate a null signal beam for the at least one estimated channel; monitoring the unlicensed band using the determined precoding operations. In response to detecting the unlicensed band to be clear of signals: transmitting at least one signal in the unlicensed
(Continued)

band with the null beam in place such that no signal is transmitted on the at least one estimated channel.

20 Claims, 6 Drawing Sheets

(51) Int. Cl.
```
H04L 5/00      (2006.01)
H04W 74/08     (2009.01)
H04B 7/06      (2006.01)
H04L 27/00     (2006.01)
H04W 16/14     (2009.01)
H04W 84/12     (2009.01)
```
(52) U.S. Cl.
CPC ......... *H04L 27/0006* (2013.01); *H04W 16/14* (2013.01); *H04W 74/0808* (2013.01); *H04B 7/0682* (2013.01); *H04L 5/001* (2013.01); *H04W 84/12* (2013.01)

(58) Field of Classification Search
CPC . H04W 16/14; H04W 72/04; H04W 72/0453; H04W 74/08; H04W 74/0808; H04W 84/12
See application file for complete search history.

(56) References Cited

U.S. PATENT DOCUMENTS

| | | | |
|---|---|---|---|
| 9,225,404 B2* | 12/2015 | Shirani-Mehr | H04W 76/15 |
| 9,312,929 B2* | 4/2016 | Forenza | H04B 7/024 |
| 9,467,999 B2* | 10/2016 | Jindal | H04W 28/0215 |
| 9,615,279 B2* | 4/2017 | Davydov | H04W 74/0816 |
| 9,936,414 B2* | 4/2018 | Chai | H04W 24/10 |
| 10,069,575 B1* | 9/2018 | Garcia Rodriguez | H04B 7/0697 |
| 10,200,094 B2* | 2/2019 | Forenza | H04B 7/0413 |
| 10,257,831 B2* | 4/2019 | Geraci | H04W 16/14 |
| 10,367,677 B2* | 7/2019 | Parkvall | H04W 52/0245 |
| 10,439,738 B2* | 10/2019 | Garcia Rodriguez | H04W 16/14 |
| 10,548,134 B2* | 1/2020 | Geraci | H04W 16/14 |
| 2009/0286482 A1 | 11/2009 | Gorokhov et al. | |
| 2009/0286562 A1 | 11/2009 | Gorokhov | |
| 2010/0137221 A1 | 6/2010 | Barrows et al. | |
| 2010/0265813 A1 | 10/2010 | Pereira et al. | |
| 2011/0039547 A1* | 2/2011 | van Rensburg | H04W 72/1252 455/423 |
| 2013/0012134 A1 | 1/2013 | Jin et al. | |
| 2013/0121379 A1 | 5/2013 | Wang | |
| 2016/0100318 A1 | 4/2016 | Wei | |
| 2017/0111801 A1* | 4/2017 | Tomeba | H04W 72/04 |
| 2018/0294850 A1* | 10/2018 | Frenger | H04B 7/0452 |
| 2018/0352577 A1* | 12/2018 | Zhang | H04W 74/0816 |

FOREIGN PATENT DOCUMENTS

| | | |
|---|---|---|
| JP | 2016-158256 A | 9/2016 |
| WO | WO 2015/109044 A1 | 7/2015 |
| WO | 2018/035522 A1 | 2/2018 |

OTHER PUBLICATIONS

Rusek et al, Scaling up MIMO: Opportunities and Challenges with Very Large Arrays, arXiv, 30 pages, Jan. 16, 2012.*
Hoydis et al, Making Smart Use of Excess Antennas: Massive MIMO, Small Cells, and TDD, Bell Labs Technical Journal 18(2), pp. 5-21, 2013.*
Claussen et al, Enhancing Coexistence in the Unlicensed Band with Massive MIMO, arXiv, 6 pages, Mar. 2017.*
Ding et al, Massive MIMO Unlicensed: A New Approach to Dynamic Spectrum Access, arXiv, 6 pages, Apr. 2017.*
Claussen et al , Operating Massive MIMO in Unlicensed Bands for Enhanced Coexistence and Spatial Reuse, IEEE, 12 pages, Jun. 2017.*
Nokia et al., "Beam sweeping," $3^{rd}$ Generation Partnership Project (3GPP), 3GPP TSG-RAN WG2 Meeting #95bis, R2-166163, 3 pages, XP051150777, Kaohsiung, Taiwan, Oct. 10-14, 2016.
Kyocera, "Further considerations on the essential functionalities for LAA," $3^{rd}$ Generation Partnership Project (3GPP), 3GPP TSG RAN WG1 Meeting #79, R1-144955, 10 pages, XP050895108, San Francisco, USA, Nov. 17-21, 2014.
"$3^{rd}$ Generation Partnership Project; Technical Specification Group Radio Access Network; Study on Licensed-Assisted Access to Unlicensed Spectrum; (Release 13)," 3GPP TR 36.889 V13.0.0, pp. 1-87, (Jun. 2015).
Muhannad Imadur Rahman et al., "License-exempt LTE systems for secondary spectrum usage: scenarios and first assessment," IEEE International Symposium on Dynamic Spectrum Access Networks (DYSPAN), pp. 349-358, 2011.
Qualcomm Technologies, Inc., "Qualcomm Research LTE in Unlicensed Spectrum: Harmonious Coexistence with Wi-Fi," pp. 1-19, 2014.
LTE-U Forum: Alcatel-Lucent, Ericsson, Qualcomm Technologies Inc., Samsung Electronics & Verizon, "LTE-U Technical Report Coexistence Study for LTE-U-SDL v1.0 (Feb. 2015)," pp. 1-52, (Feb. 2015).
International Search Report for PCT/EP2017/076061 dated Jan. 11, 2018.
R1-144339, Inter-operator and Inter-RAT co-existence techniques for LAA using LTE, 3GPP TSG RAN WG Meeting #78bis, Ljubljana, Slovenia, Oct. 6-10, 2014, 6 pages.
English Bibliography of Japanese Pat. Application Publication No. JP2012524497A, Published on Oct. 11, 2012, Printed from Derwent Innovation on Aug. 20, 2020, 6 pages.
English Bibliography of Japanese Pat. Application Publication No. JP2015228664A, Published on Dec. 17, 2015, Printed from Derwent Innovation on Aug. 20, 2020, 10 pages.
English Bibliography of Japanese Pat. Application Publication No. JP2016158256A, Published on Sep. 1, 2016, Printed from Derwent Innovation on Aug. 20, 2020, 20 pages.
European Pat. Application No. 16193756.0, "Extended European Search Report", dated Mar. 17, 2017, 13 pages.
PCT Pat. Application No. PCT/EP2017/076061, "Written Opinion of the International Searching Authority", dated Jan. 11, 2018, 10 pages.

* cited by examiner

Illustrating use of frames and subframes for scheduling and carrier aggregation in LTE.

FIG. 1

Illustrating CSMA/CA scheduling using by WiFi

FIG. 2

(a) CSAT  (b) LBE

Illustrating main LTE co-existence approaches

SHARING RESOURCES IN AN UNLICENSED FREQUENCY BAND

FIELD OF THE INVENTION

The invention relates to the field of unlicensed band communications and in particular, to reducing interference between signals from different nodes each using the band.

BACKGROUND

The use of the unlicensed spectrum by mobile network operators, particularly in the 5 GHz band, has recently been attracting considerable attention, and vendors and operators are already actively studying its viability for long term evolution (LTE)/4G cellular networks.

Two main approaches to unlicensed LTE are currently being developed, referred to as LTE-Unlicensed (LTE-U) and Licensed Assisted Access (LAA). Both augment an existing LTE licensed band interface with unlicensed band transmissions. LTE-U is a simplified scheme that targets early deployment. LTE-U aims to operate in accordance with the existing LTE Rel. 10/11/12 LTE PHY/MAC standards, and thus does not use listen-before-talk (LBT). However, the absence of LBT restricts its use to regions, such as the US, where this is not required by unlicensed band regulations. LAA is intended to be used more widely, and so will include LBT and other features (e.g. minimum bandwidth occupancy, transmit power spectral density) required to conform with, for instance, European and Japanese regulations.

A major aspect of ongoing discussions is the requirement to provide fair co-existence with other technologies working in the unlicensed spectrum. Given that current technologies in unlicensed bands, such as WiFi, rely on contention-based access, there is a concern that starvation and other forms of unfairness may occur when they co-exist with a schedule-based technology such as LTE-U/LAA/MuLTEFire.

In particular, WiFi's use of channel sensing means that WiFi devices will not start a transmission while LTE-U/LAA/MuLTEFire are transmitting, and unless LTE-U/LAA/MuLTEFire leave idle periods where WiFi devices can access the channel, then WiFi devices may be starved of access. Conversely, since WiFi transmissions occur at random times, these transmissions may overlap with LTE-U/LAA/MuLTEFire frame boundaries and cause significant interference or cause LTE-U/LAA/MuLTEFire to refrain from transmission.

Co-existence of multiple LTE-U/LAA/MuLTEFire operators within the same unlicensed band is also a major concern as is the use of a large number of WiFi nodes within a limited area.

This application seeks to provide a method, network node and computer program that enhances the sharing of the spectrum in the unlicensed band both between nodes using the same technology and those that use different technologies.

SUMMARY

A first aspect of the present invention provides a method performed at a multiple input multiple output network node operable to transmit signals in an unlicensed band, said method comprising: estimating at least one channel within said unlicensed band between at least one access network node operable to transmit in said unlicensed band and said multiple input multiple output network node; determining precoding operations required to generate a null signal beam for said at least one estimated channel; monitoring said unlicensed band using said determined precoding operations; and in response to detecting said unlicensed band to be clear of signals: transmitting at least one signal in said unlicensed band with said null signal beam in place such that no signal is transmitted by said multiple input multiple output network node on said at least one estimated channel.

The inventors of the present invention recognised that the use of listen before talk as a way of mitigating interference between signals transmitted in an unlicensed band has several drawbacks particularly where the number of devices using the bandwidth is high, as individual devices may be starved of access as listening will tend to indicate use of the band.

Figure 1:
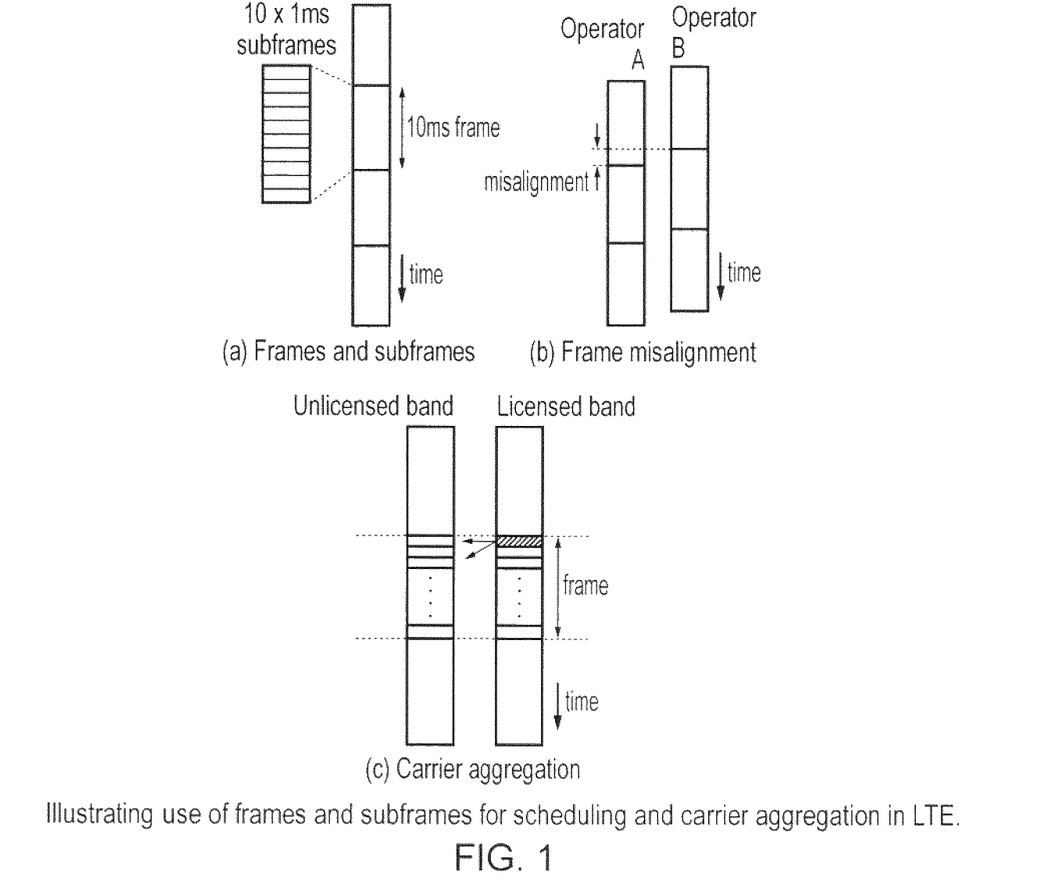
FIG. 1 illustrates frames and subframes for scheduling and carrier aggregation in LTE.
Figure 2:
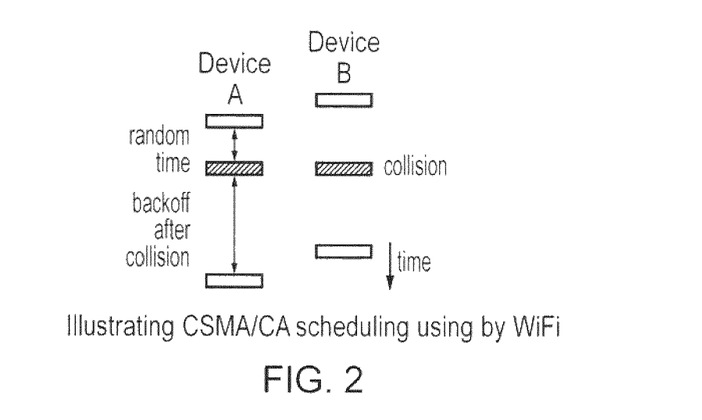
FIG. 2 shows scheduling by a WiFi access point.

Furthermore, where the band is shared between WiFi devices and LTE devices this problem may be exacerbated. One basic difference between LTE-U/LAA/MuLTEFire and WiFi is that WiFi defers transmissions when it detects the channel to be busy. Another is that LTE-U/LAA/MuLTEFire unlicensed band transmissions must be aligned with fixed frame/subframe boundaries, see FIG. 1, whereas WiFi transmissions are not subject to this constraint, see FIG. 2. With these differences in mind, the main approaches currently under consideration for ensuring co-existence when LTE-U/LAA/MuLTEFire and WiFi nodes share the same channel include the following:

One approach is CSAT (Carrier Sense Adaptive Transmission), which is mainly targeted at early deployments and for the US market where LBT is not required. In this approach, an LTE base station schedules transmissions periodically, leaving idle times between transmissions to allow WiFi devices to transmit. For example, the base station may transmit on every other frame boundary so that it transmits one 10 ms frame and then leaves the channel idle during the next 10 ms frame, yielding a 50% on-off duty cycle, see FIG. 3(a).

Figure 3:
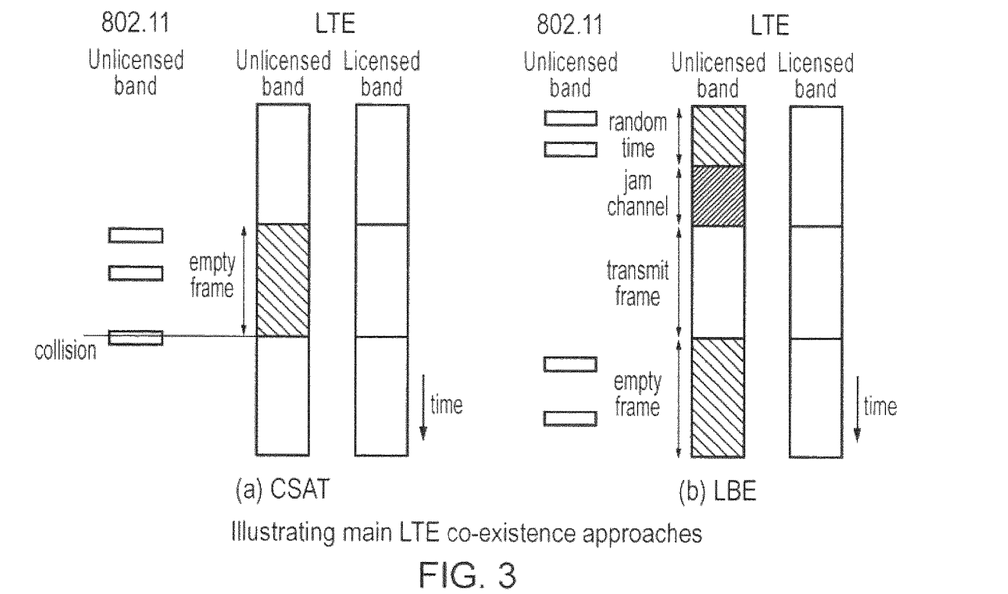
FIG. 3 shows some conventional LTE and WiFi co-existence approaches.

However, note that a WiFi transmission may start towards the end of a CSAT idle period, and so overlap with the start of an LTE transmission due to the absence of channel sensing, as illustrated in FIG. 3(a) (where it is marked "collision"). Such collisions at the start of an LTE transmission reduce both LTE and WiFi throughput.

An alternative to CSAT is LBT (listen before talk), in which the LTE base station senses the channel using energy detection within a designated time before starting transmissions in the unlicensed band. Such sensing is mandatory in regions such as Europe and Japan.

This is similar to the random access procedure used by WiFi devices and is recommended by the 3GPP as the baseline approach for LAA downlink transmissions. A significant advantage of using a similar random access procedure to 802.11 devices to win transmission opportunities is that fair co-existence with 802.11 devices can be more easily guaranteed.

However, when a transmission opportunity is obtained, it will, of course, not usually be aligned with an LTE subframe boundary, and LTE devices cannot start transmissions until the next subframe boundary is reached. To hold onto the channel and prevent WiFi devices from starting transmissions, the LTE basestation may transmit a reservation/jamming signal, causing WiFi devices to detect the channel as being busy and so defer their transmissions, see FIG. 3(b). Unfortunately, this reservation signal can only be transmitted at given subframe entry points, which mitigates but does not solve the issue, and may represent a significant overhead.

At least some of these problems have been addressed by the inventors with the use of a multiple input multiple output network node. This is a network node, such as a base station or an access point that has multiple antenna and with the use of precoding operations used to form beams in different directions. This allows for different beams to be transmitted using channels that are substantially spatially orthogonal to each other.

Prior to performing unlicensed band transmissions, the multiple input multiple output MIMO network node estimates channel(s) between the network access node(s) and itself that are used by network access node(s) for unlicensed band communications. These network access nodes may be user equipment using WiFi or WiFi access points and each use listen before talk when transmitting on the unlicensed band. When the MIMO network node has determined these channel(s), it then performs precoding operations to form a beam on the estimated channel(s) and then provides a null signal on this beam such that no signal is transmitted on this channel when the precoding is in place. The precoding is in place when the listen before talk is performed and owing to the reciprocal nature of uplink and downlink signals, any signals present on this channel are in effect muted at the receiver, such that in many cases no signals will be detected. That being the case, the MIMO network node is free to transmit signals in the unlicensed band provided that it preserves the null signal on the channel(s) of the network access point(s). The preservation of the null signal ensures no or low interference with the signals from the network access point(s).

In effect a multiple input multiple output network node provides many degrees of freedom dependent on the number of antenna and can generate a number of spatially orthogonal beams using beamforming. By using one or more of these beams as null signal beams, interference with signals from network access points that it has estimated transmit on the corresponding channels can be avoided or at least reduced. Other substantially orthogonal or uncorrelated beams can then be used for transmission of signals to user equipment. Thus, the number of user equipment that can be served is reduced compared to all the beams being used to transmit signals, but the coexistence with other nodes is improved and the listen before talk step is far less likely to be a bar to subsequent transmissions.

In some embodiments, the method further comprises in response to detecting said unlicensed band being used by an access network node, not transmitting signals on said unlicensed band for a predetermined time, and after said predetermined time performing said step of monitoring again.

Although, having null signal beams corresponding to the estimated channel between the access network node and the multiple input multiple output node reduces the likelihood of the listening or monitoring step returning a positive, where a signal is detected then conventional behaviour of backing off can be used such that the network node does not transmit signals on the unlicensed band for a predetermined time and after that predetermined time performs the step of monitoring again to determine whether it may now use that frequency band.

In some embodiments, before performing the step of monitoring again the precoding operations may be updated using the previously monitored data such that an updated null signal beam may be formed based on more recent estimated channel information. These may more accurately reflect the current channels being used by the network access points and therefore may further reduce the probability of the monitoring step detecting signals.

In some embodiments, said step of transmitting, comprises performing precoding operations to form a predetermined number of beams, said predetermined number of beams being less than or equal to a number of available degrees of freedom of said multiple input multiple output network node and said beams including: said at least one null signal beam corresponding to said at least one estimated channel between said access network node and said multiple input multiple output network node, and at least one further beam, and transmitting signals on said at least one further beam and not transmitting signals on said at least one null signal beam.

Once the monitoring has been performed and it is determined that the unlicensed band is available then transmission of the signals can be performed. The step of transmitting comprises using precoding to generate substantially uncorrelated beams directed towards user equipment that are scheduled to be served. In this regard, the multiple input multiple output network nodes can generate a number of orthogonal beams, this number depending on the number of available degrees of freedom of the network node which in turn depends on the number of antenna. In this regard, in massive MIMO, there are M degrees of freedom where there are M antennas at the base station. In the downlink, this means that you can choose a precoding vector in 1 out of M dimensions. If you are serving k users where k<M, you require K precoding vectors, and do the precoding in a subspace of dimension K in a larger space of dimension M. These precoding vectors are selected based on your channel estimates. Having excess degrees of freedom means that M>>K. This means that the K true channel vectors will be spread out in the M-dimensional space such that they are "far" from each other. Even one of the channels is not accurately estimated, the estimate is still likely to be far from another channel vector. In the current case some of these orthogonal beams are reserved for the null signals required on the estimated channels to reduce interference effects with other access nodes using the same unlicensed band, and this leaves other orthogonal beams available for the transmission of user equipment signal. Thus, in the transmission step precoding operations are performed to generate the required orthogonal channels or beams and the signals are transmitted on the ones that are not reserved for the null signal beams.

In some embodiments, said step of estimating comprises monitoring at least one pilot signal transmitted by said at least one network access node.

The step of estimating can be done in a number of ways and in some embodiments it is done by monitoring pilot signals transmitted by the network access nodes. In some embodiments these signals are pilot signals configured for receipt by the MIMO network node and comprise channel information. In this case, the channel estimation is very accurate but a special additional pilot signal is required.

In other embodiments, the MIMO network nodes may have circuitry for recognising and decoding other legacy pilot or beacon signals from the network access nodes, allowing these signals to be detected and monitored and from this monitoring an estimation of the channel between the network access node and the MIMO network node to be determined. In this regard the circuitry may comprise some form of WiFi decoder that is aware of the time and frequency on which pilot signals from such access points are transmitted and also has a code book for identifying such signals.

In some embodiments, the multiple input multiple output network node may determine the channel of the network access point(s) from the strength of signals output by the network access node that are detected. This is a less accurate way of estimating channels and involves beam sweeping by the network node. This comprises forming beams in successive segments and monitoring the strength of signals from the network access nodes within these segments. The segments with the higher level of detected signals are those where null signal beams are formed using precoding operations so as to reduce interference between signals transmitted in the unlicensed frequency band by the MIMO network node and by the network access points.

In some embodiments, said multiple input multiple output network node is operable to transmit signals in both a licensed and an unlicensed band.

Although in some embodiments the multiple input multiple output network node is a network access node such as a WiFi access point in other embodiments, it may be a base station operable to transmit signals in a licensed band using LTE and being adapted to transmit these LTE signals in the unlicensed band too. It should be noted that the co-existence of LTE signals and WIFI signals in the unlicensed band generates its particular problems as LTE signals are limited to a start of a frame or sub frame whereas WIFI signals are transmitted at any point following a listening phase which determines there is currently no contention. The use of beam forming to reduce the probability of interference between signals generated and transmitted by the base station and those of the access nodes helps elevate these problems.

In some embodiments, the method further comprises periodically repeating said step of estimating and in response to detecting changes in said at least one estimated channel updating said precoding operations.

The determination of the estimated channel(s) of the WiFi access node(s) should be periodically updated as these access nodes may move and their operations may change such that they may at some point be quite active while at other points they may be dormant. Thus, if the current method is to alleviate collisions between the nodes it is advantageous if it has an up to date understanding of the use of the unlicensed frequency band by the competing network access nodes.

A second aspect of the present invention provides a multiple input multiple output network node operable to transmit signals in an unlicensed band, and comprising: multiple antenna; estimation logic operable to estimate at least one channel within said unlicensed band between at least one network access node operable to transmit in said unlicensed band and said multiple input multiple output network node; precoding logic operable to generate precoding operations to be performed on signals output by said multiple antenna such that a null signal beam is formed for said at least one estimated channel; signal detection circuitry for monitoring signals in said unlicensed band received at said multiple antenna and on which said precoding operations have been performed; transmission logic for generating and transmitting signals from said multiple antenna; and control logic operable in response to said signal detection logic indicating said unlicensed band to be clear of signals: to control said transmission logic to transmit signals in said unlicensed band with said null signal beams in place such that no signals are transmitted on said at least one estimated channel.

In some embodiments, said control logic is operable in response to said signal detection logic indicating said unlicensed band being used by an access network node: to control said transmission logic not to transmit signals in said unlicensed band for a predetermined time, and after said predetermined time to control said signal detection circuitry to perform said monitoring again.

In some embodiments, said control logic is operable prior to controlling said signal detection circuitry to perform said monitoring again, to control said precoding logic to update said precoding operations using updated channel information determined during said monitoring.

In some embodiments said transmission logic is operable to perform precoding operations to form a predetermined number of beams, said predetermined number of beams being less than or equal to a number of available degrees of freedom of said multiple input multiple output network node and said beams including_said at least one null signal beam corresponding to said at least one estimated channel between said access network node and said multiple input multiple output network node and at least one further channel for transmission of signals to user equipment, said transmission logic being operable to transmit signals on said at least one further channel and not transmit signals on said at least one null signal beam.

In some embodiments, said estimation logic is operable to estimate said at least one channel by monitoring at least one pilot signal transmitted by said at least one network access node.

In some embodiments, said at least one pilot signal comprises a pilot signal comprising channel information and configured for receipt and decoding by said multiple input multiple output network node.

In other embodiments, said precoding logic is operable to generate different precoding operations so as to form beams in successive segment of a radio coverage area of said multiple input multiple output network node, and said signal detection circuitry is operable to monitor a strength of signals transmitted by said at least one network access node within said segments, and for segments where said detected signal strength is above a predetermined level, said control logic is operable to control said precoding logic to perform precoding operations such that said null signal beam is formed in said segments.

In some embodiments, said multiple input multiple output network node comprises a base station.

In some embodiments, said multiple input multiple output network node comprises a data store for storing said at least one estimated channel, said estimation logic being configured to periodic repeat said step of estimating and in response to detecting changes in said at least one estimated channel compared to said stored at least one estimated channel to update said precoding operations.

A third aspect of the present invention provides a network access node operable to transmit signals in an unlicensed band, said network access node comprising circuitry configured to generate a pilot signal indicative of a channel used by said network access point and to transmit said pilot signal at a time and frequency and in a format suitable for receipt and decoding by a multiple input multiple output network node.

Providing network access nodes with the logic to generate pilot signals specifically for decoding by a MIMO network node and which pilot signals contain information indicative of the channel between the network access node and MIMO node, is an effective way of providing channel estimation information to the MIMO network node such that an accurate estimate of the channel between the network access node and MIMO node can be derived and the corresponding null beam accurately generated. This results in an effective co-existence system which makes efficient use of the available resources.

A fourth aspect of the present invention provides a method performed at a network access node operable to transmit signals in an unlicensed band, said method comprising: generating a pilot signal indicative of a channel used by said network access point in a format decodable by a multiple input multiple output network node; and transmitting said pilot signal at a predetermined time and frequency for receipt by said multiple input multiple output network node.

A fifth aspect of the present invention provides computer program operable when executed by a computer to perform a method according to a first or fourth aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

A multiple input multiple output network node uses precoding operations on signals at the different antenna to form beams within the spatial domain surrounding the antenna. With the use of appropriate precoding operations beams that are orthogonal to each other are provided. Where the channels between network access points and the MIMO node are estimated, precoding operations can be used to form beams along these channels and a null signal beam may then be provided on these channels prior to the network node performing a listening before talk operation. Given the reciprocal nature of uplink and downlink signals providing a null signal beam in this way significantly reduces the chance of any signals from the network access points being detected in the listen before talk process. Furthermore, if no signals are detected and transmission is started with the null signals still in place, it is unlikely that these signals will interfere with or be detected by the network access points enhancing co-existence between the nodes.

In summary, radiation pattern nulls are generated at the multiple input multiple output massive MIMO node which may be a base station or another access point and these nulls are pointed towards neighboring Wi-Fi devices (either access points (APs) or users (UEs) as Wi-Fi packets for DL and UL share the same radio), so that the interference generated towards these Wi-Fi devices is reduced. This allows the massive MIMO node and the Wi-Fi devices to use the unlicensed band simultaneously with reduced or no interference between them.

In order to point such nulls towards neighboring Wi-Fi devices, the challenge is to estimate the channel between the massive MIMO base station and such neighboring Wi-Fi devices. For this, and considering the TDD (time division duplexing) operation in the unlicensed band where the reciprocity of the channel in DL and UL direction holds, we propose to either equip the Wi-Fi devices with the capabilities in terms of circuitry and intelligence to transmit a new pilot that the massive MIMO base station can process and estimate the channel from, or equip the massive MIMO base station with signal processing capabilities able to estimate the channel based on current and a-priori known Wi-Fi signaling, e.g., Wi-Fi beacon structures. An initialization/ training phase may be needed for the massive MIMO base station to get to know the Wi-Fi environment and their transmitted pilots.

We also propose that these channels are learnt periodically when the massive MIMO base station is not in data phase transmission. The channels may be learnt over time and stored in a data base, having regular updates according to the channel coherence time.

Once the channels are estimated and a packet arrives for downlink transmission to the massive MIMO base station, then before doing the mandatory listening-before-talk, the massive MIMO base station performs a 'beamforming-before-listen' to point nulls towards the neighboring Wi-Fi devices using the estimated channel(s), and thereafter the massive MIMO base station performs the listening-before-talk with the nulls in place. Thanks to the nulls, the massive MIMO base station is likely to assess the channel as idle. Moreover, thanks to channel reciprocity, if the massive MIMO base station does not receive any significant Wi-Fi-transmitted power during the listening-before-talk with the nulls in place, then it will also not generate any significant interference at the Wi-Fi devices during the transmit-beamforming data phase, presented in the following, (as long as the same nulls are in place).

If the listening-before-talk is successful, then the massive MIMO base station performs a transmit-beamforming data phase, keeping the nulls towards the neighboring Wi-Fi devices and creating beams towards the connected UEs. The quality of the nulls should always have priority over the quality of the created beams to ensure co-existence, i.e., the massive MIMO base station should always guarantee that its data transmission beams are sufficiently orthogonal to the Wi-Fi channel subspace.

If the listening-before-talk is not successful, then the massive MIMO base station does not transmit and performs regular operation, e.g., back-off, etc., or repeats the proposed initialization/training phase in order to improve and update the knowledge of the Wi-Fi environment. In this regard the data acquired during the listening phase can be used to update the channel estimation.

In the event that the intended UE for the downlink transmission is in the direction of the WiFi station, since there is a null towards it, the massive MIMO base station may not be able to transmit to such UE. In such case, the base station does not use the proposed 'beam-forming-before-listen' and either schedules such UE in the licensed band or performs regular operation with the available listening-before-talk (uniform in all directions) in the licensed band.

The proposed scheme is fully distributed, easily scalable, and it allows spatial reuse, i.e., LTE-U/LAA/MuLTEFire and Wi-Fi reusing the spectrum simultaneously, while reinforcing co-existence. The null towards co-existing nodes make it possible to suppress interference.

Figure 4:
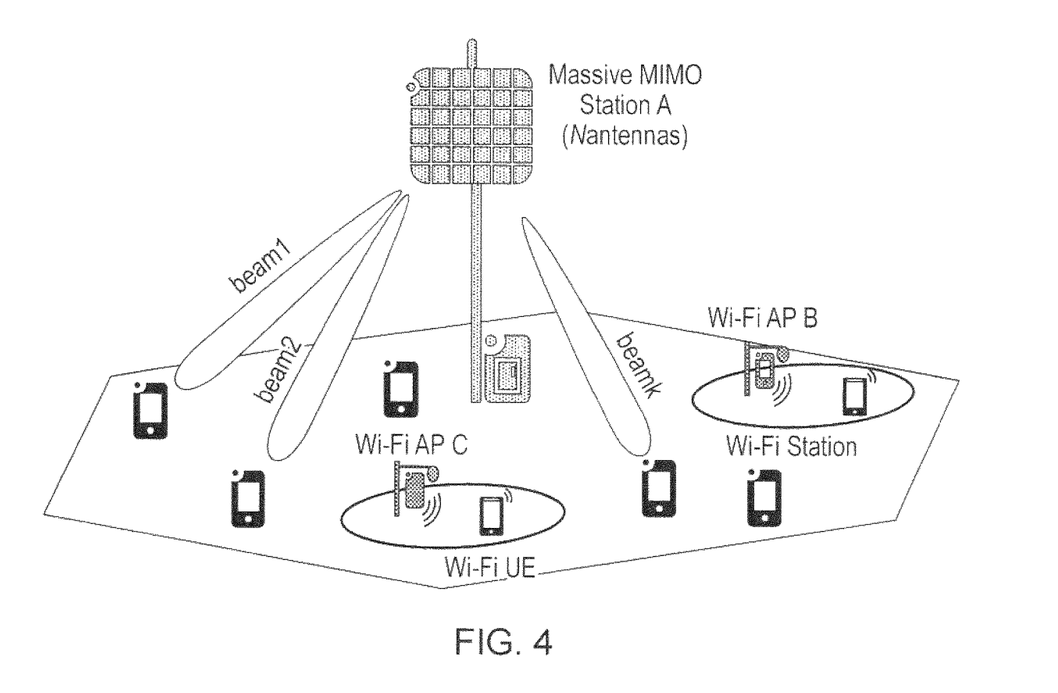
FIG. 4 schematically shows co-existence according to an embodiment.

FIG. 4 shows a massive MIMO base stations, A, and two Wi-Fi access point, B and C, operating in the unlicensed band (TDD operations), and communicating with their respective sets of connected UEs, X, Y and Z, respectively, in downlink.

The massive MIMO base station is equipped with a large number of antennas N, and can simultaneously serve x UEs (x is a subset of X) through spatial multiplexing and it is able to generate K=x parallel and spatially separated beams with nulls in the direction of the pre-detected Wi-Fi devices. While the number N is fixed, the value of K (and accordingly x) can be chosen adaptively by the scheduler.

In each cell, different UEs experience different average channel gains to/from the BS, due to the distance-dependent path loss and shadowing. For example, UEs located at the cell center, i.e., close to the serving BS, have higher average channel gains. On the other hand, UEs located at the cell edge, i.e., far from the serving BS, have lower average channel gains.

New Pilot Signal at Wi-Fi Devices

In a first embodiment, the Wi-Fi devices are equipped with a new capability in terms of circuitry and intelligence to transmit a new pilot that the massive MIMO base station can process and from which it can estimate the channel between itself and the Wi-Fi devices. Since Wi-Fi devices use LBT, no two close by Wi-Fi devices will transmit simultaneously, which avoids pilot contamination.

Having such capabilities, in a first time slot, the Wi-Fi APs and its associated UEs transmit the new pilot signal.

At a subsequent time slot, the massive MIMO base station estimates the channel between each Wi-Fi device and itself. Such channel estimation is kept in a memory and updated after a given time.

Figure 5:
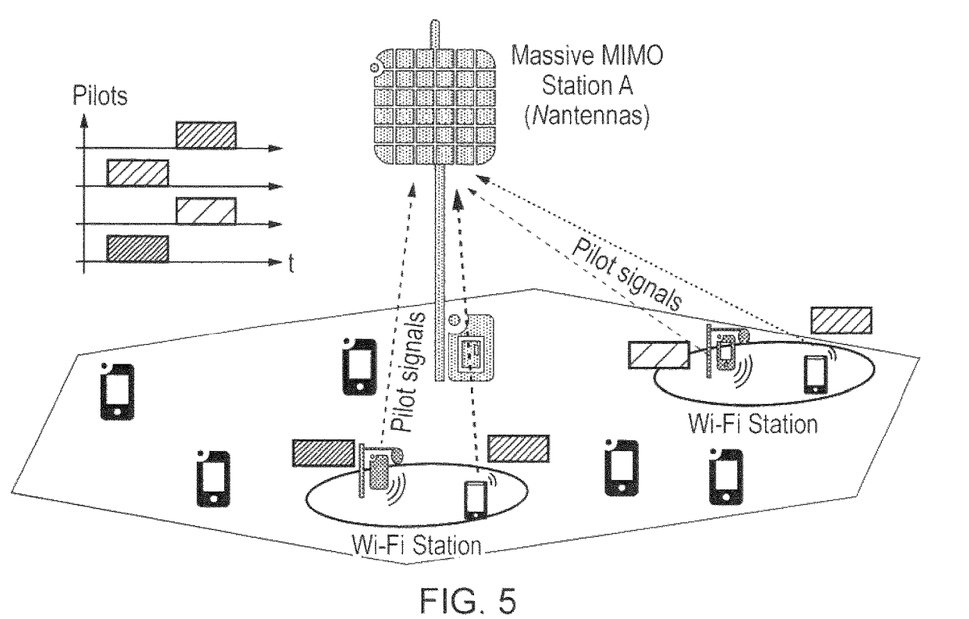
FIG. 5 schematically shows channel estimation using a pilot signal generated by an access point according to an embodiment.

FIG. 5 shows an example of the above system where the network access nodes, WiFi access points or UEs transmit these novel pilots. The pilots are configured such that the massive MIMO base station can recognize and decode them and estimate the channel between the network access nodes and the MIMO in a straight forward and accurate manner. However, this scheme does require the use of these additional new pilots. As noted above the transmission of the new pilots generally does not occur simultaneously due to Wi-Fi's LBT and because of this, the channels are learnt and estimated one by one. If these transmissions do happen simultaneously, due to collision, the massive MIMO BS would estimate an "aggregate" of the channels, and it would perform receive filtering operations towards the aggregate as explained in the following subsections. This should not be a problem.

New Signal Processing at Massive MIMO Base Station

Figure 6:
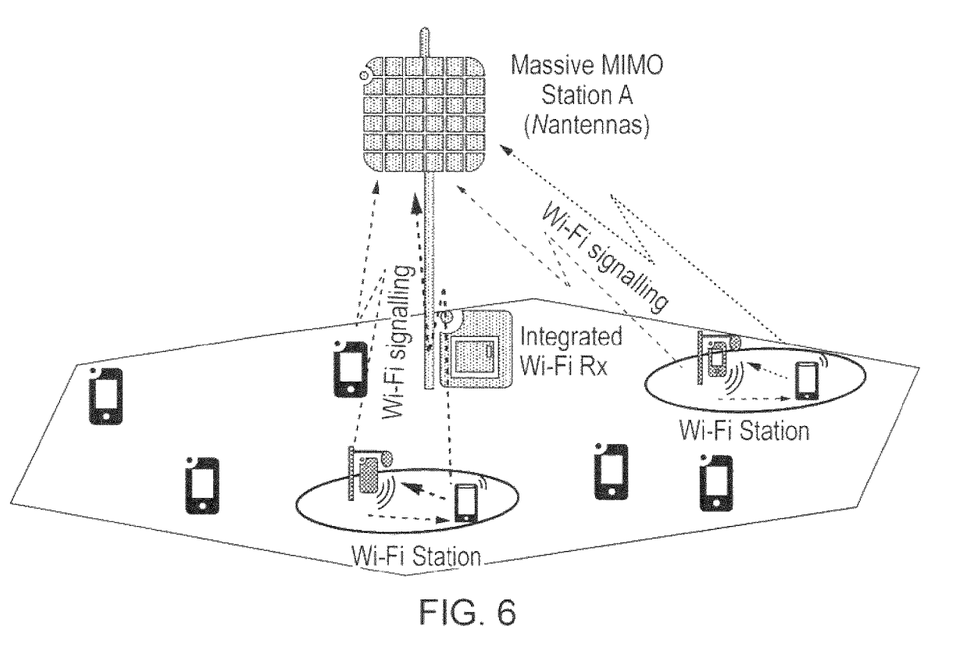
FIG. 6 schematically shows channel estimation using signal processing at the MIMO node according to an embodiment.

In a second embodiment, shown in FIG. 6 the massive MIMO base station is equipped with a new capability in terms of signal processing to estimate the channel over the frequency domain between each of its active antennas K and the Wi-Fi devices based on current and a-priori known Wi-Fi signaling, e.g., beacon signals, RTS, CTS, ACK, etc.

Having such capabilities, in a first time instants, the Wi-Fi AP B and its associated UEs Y transmit the known signals as part of their regular procedure. These transmissions will not happen simultaneously due to LBT operating at the Wi-Fi devices.

At a subsequent time instant, the massive MIMO base station estimates the channel between each Wi-Fi device and itself using its new signal processing. Such channel estimation is kept in a memory and updated after a given time (periodically or during transmission holes).

Discrete Beam Sweeping for Massive MIMO Channel Estimation

Figure 7:
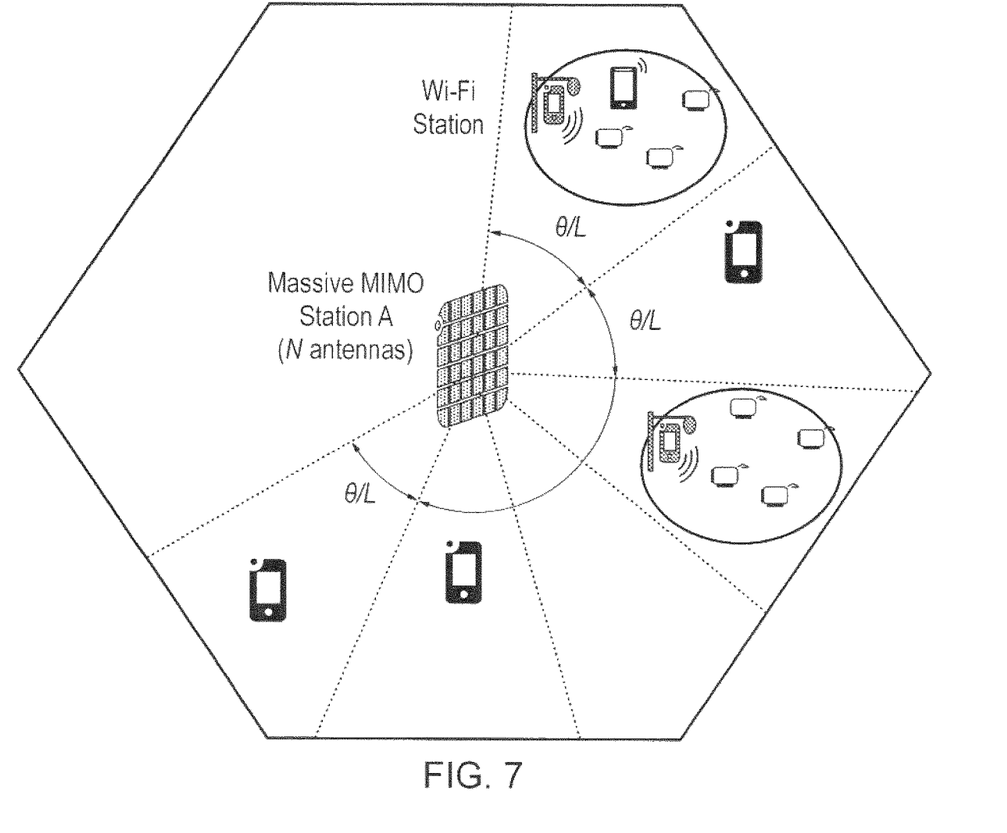
FIG. 7 schematically shows an example of discrete beam sweeping for MIMO channel estimation according to an embodiment.

In a third embodiment shown in FIG. 7, the massive MIMO base station performs a channel estimation through a discrete beam sweeping. The full massive MIMO bearing range $\theta$ is divided into L segments, on which a selective channel estimation is performed with a coverage angle of $\theta/L$.

The massive MIMO base station is equipped with new capabilities to perform the channel estimation between the massive MIMO base station and the Wi-Fi devices positioned in the geographical area covered by the $\theta/L$ tracking angle. At a subsequent time instant, the massive MIMO beam for the channel estimation moves to the next coverage angle to track the position of any Wi-Fi devices positioned in the subsequent segment of the geographical area. After L acquisitions all the geographical area is covered and the massive MIMO completes the channel estimation procedure.

The procedure is performed using energy detection to determine whether the channel in the given direction is busy. The larger the angle $\theta$ the less accurate the method, however decreasing the angle increases the time required to perform the channel estimation and this can also lead to inaccuracies as channels may have changed before the listening before talk is performed.

In other embodiments the procedure of beam sweeping is performed using the previously described pilot and WiFi signalling methods of the first and second embodiments. In such a case, the discrete beam sweeping method is used when the number of channel estimations towards Wi-Fi devices is large, so that dividing the full spatial range in L different acquisitions reduces the probability of having simultaneous pilot signals received by the massive MIMO base station (pilot signalling method) or reduces the time required to exchange the Wi-Fi signaling between Wi-Fi devices and the massive MIMO base station (Wi-Fi signaling method).

Beam Form-Before-Listening

Figure 8:
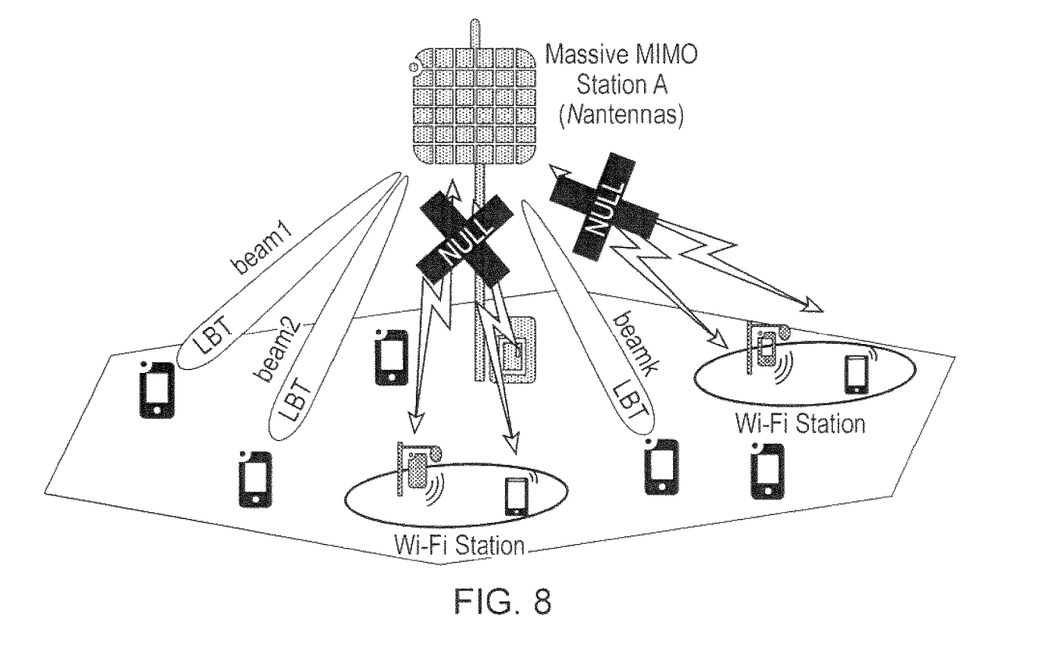
FIG. 8 schematically shows an example of beamforming before listening according to an embodiment.

This is shown schematically in FIG. 8. When a packet arrives for downlink transmission to the massive MIMO base station A, then before doing the mandatory listening-before-talk, as it would do as part of its regular unlicensed band procedure, the massive MIMO base station A takes the channel estimates to the surrounding Wi-Fi AP B and its UEs Y learnt previously over time and applies a receive filter using precoding operations, a.k.a. 'beamforming-before-listen', to point nulls towards such neighboring Wi-Fi devices.

Once the precoding has been devised, the massive MIMO base station A performs the listening-before-talk, with the nulls in place. Thanks to channel reciprocity, if the massive MIMO base station does not receive any significant Wi-Fi-transmitted power during the listening-before-talk with the nulls in place, then it will also not generate any significant interference at the Wi-Fi devices during the transmit-beamforming phase (as long as the same nulls are in place). The massive MIMO base station A may also try to learn the channel towards neighboring Wi-Fi devices while doing listening-before-talk if the circumstances allow it.

If the listening-before-talk is successful, then the massive MIMO base station A performs a data transmission as indicated in the next section.

If the listening-before-talk is not successful, then the massive MIMO base station does not transmit and performs regular operation, e.g., back-off, etc., or repeats the proposed initialization/training phase in order to improve and update the knowledge of the Wi-Fi environment. As an enhancement, the massive MIMO base station may not perform exponential backoff but just a linear backoff to gain access to the channel faster and then apply a refined beamforming-before-listen precoding, e.g., with the channel estimates it acquired during the previous failed listening-before-talk.

Data Transmission

Figure 9:
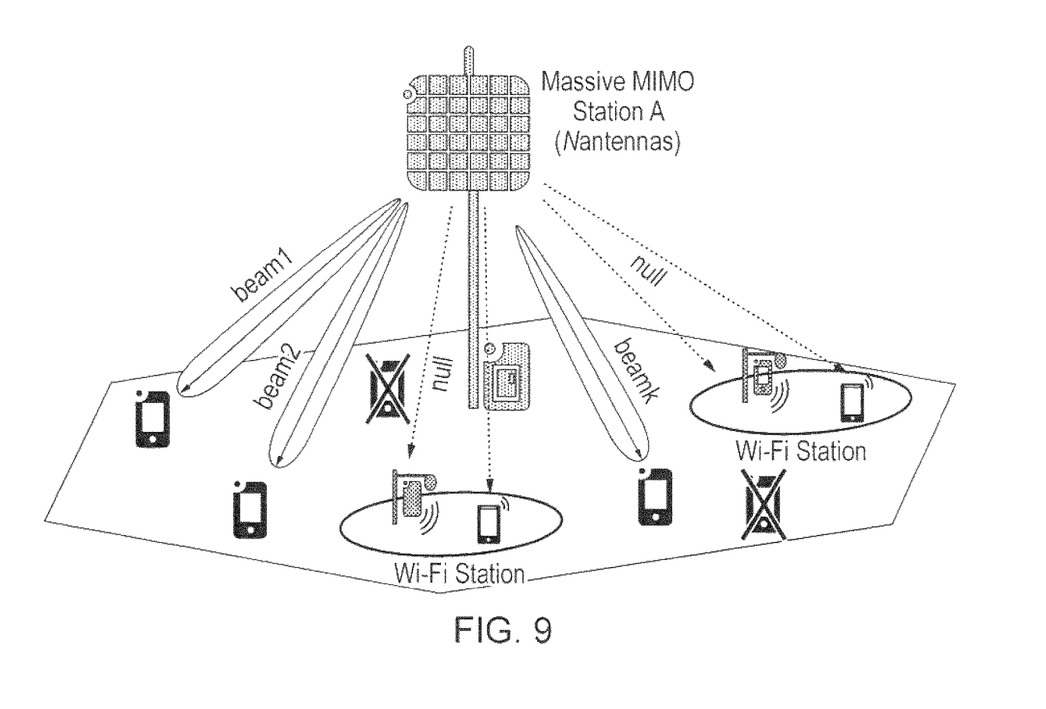
FIG. 9 schematically shows transmissions performed following beamforming and listening according to an embodiment.

If the listening-before-talk is successful, then the massive MIMO base station A performs a transmit-beamforming, keeping the nulls towards the neighboring Wi-Fi AP B and its UEs Y and creating beams towards the subset of served UEs x, which has been selected by the scheduler. The quality of the nulls should have always priority over the quality of the created beams to ensure co-existence, i.e., the massive MIMO base station should always guarantee that its data transmission beams are sufficiently orthogonal to the Wi-Fi channel subspace. The latter is achieved by trading off part of the beamforming gains to its served UEs for interference reduction to neighboring Wi-Fi devices. In other words, the massive MIMO base station should sacrifice some spatial degrees of freedom, i.e., excess antennas, to reduce interference towards the directions from which it receives the most Wi-Fi-transmitted power (see FIG. 9).

Figure 10:
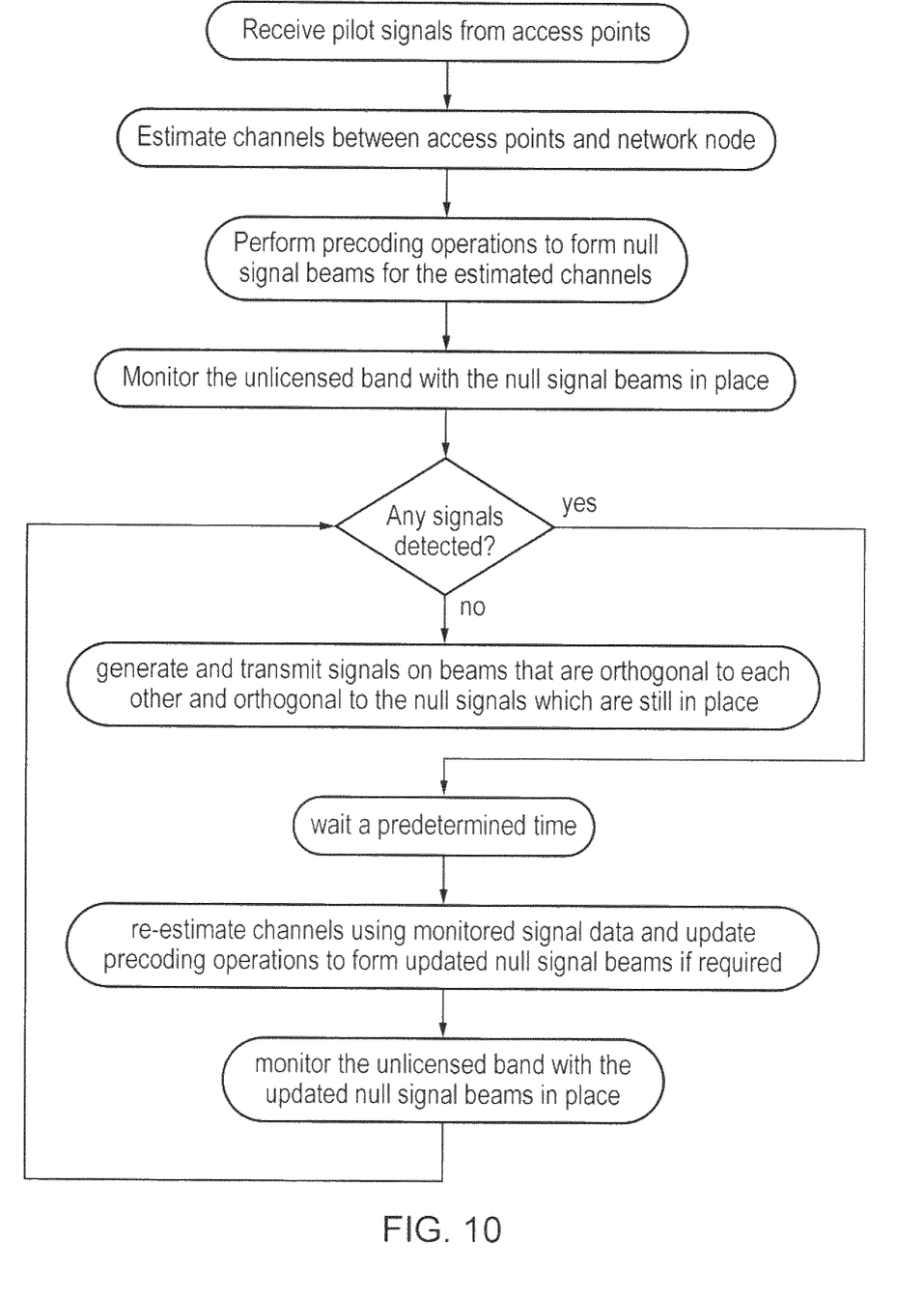
FIG. 10 shows steps in a method performed at a MIMO node according to an embodiment.

In the event that an intended UE for the downlink transmission is in the direction of, e.g., the Wi-Fi station B, since there is a null towards it, the massive MIMO base station may not be able to transmit to such UE. It is the task of the scheduler, in the presence of a plurality of UEs X, to select UEs for transmission that are not in the direction of the nulls. This scheduling is specified in a different invention submission FIG. 10 shows a flow diagram illustrating steps in a method performed at a massive MIMO network node according to an embodiment. The MIMO network node estimates the channels within the unlicensed band between itself and network access nodes, such as WiFi access Points and UEs communicating with them. It may do this using dedicated pilot signals indicating channel conditions, or it may derive the channels from other pilot signals output by the nodes, or it may estimate the channels by detecting the signal levels from these devices in segments around the node.

Once the channels have been estimated precoding is performed to generate beams for these channels and null signal beams are then provided on these channels during the monitoring or listening before talk step.

If the monitoring indicates the unlicensed band is available for transmissions, then signals are transmitted as beams towards scheduled UEs located at places suitable for receipt of such signals. Precoding operations are such that the null signals pointing towards the network access points are still in place. User equipment located in the same direction as the network access points cannot be served by the transmitted signals as the beams sending the signals need to be sufficiently orthogonal with the null beams to keep interference with the access points low.

If the listening before talk step detects a signal then the network node backs off for a predetermined time and during this time updates the channel estimations and precoding for the nulls using data indicative of the channel acquired during the monitoring or listening phase. The monitoring will then proceed with the updated nulls in place.

In this way a method is provided that allows improved co-existence between nodes operating in the same unlicensed frequency band by using MIMO techniques to provide sufficient spatial orthogonality between transmitted signals and nulls.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a multiple input multiple output network node operable to transmit signals in an unlicensed band, said method comprising:
    estimating at least one channel within said unlicensed band between at least one network access node operable to transmit in said unlicensed band and said multiple input multiple output network node;
    determining precoding operations required to generate a null signal beam for said at least one estimated channel;
    monitoring said unlicensed band using said determined precoding operations; and
    in response to detecting said unlicensed band to be clear of signals, transmitting at least one signal in said unlicensed band with said null signal beam in place such that no signal is transmitted by said multiple input multiple output network node on said at least one estimated channel.

2. A method according to claim 1, said method further comprising in response to detecting said unlicensed band being used by network access node, not transmitting signals on said unlicensed band for a predetermined time, and after said predetermined time performing said monitoring again.

3. A method according to claim 2, comprising prior to performing said step of monitoring again, updating said precoding operations using updated channel information determined during said monitoring.

4. A method according to claim 1, wherein said transmitting, comprises performing precoding operations to form a predetermined number of beams, said predetermined number of beams being less than or equal to a number of available degrees of freedom of said multiple input multiple output network node and said beams including said at least one null signal beam corresponding to said at least one estimated channel between said network access node and said multiple input multiple output network node and at least one further beam, and transmitting signals on said at least one further beam and not transmitting signals on said at least one null signal beam.

5. A method according to claim 1, wherein said estimating comprises monitoring at least one pilot signal transmitted by said at least one network access node.

6. A method according to claim 5, wherein said at least one pilot signal comprises a pilot signal configured for receipt and decoding by said multiple input multiple output network node.

7. A method according to claim 1, wherein said estimating comprises performing beam sweeping by forming beams in successive segment of a radio coverage area of said multiple input multiple output network node, and monitoring a strength of signals transmitted by said at least one network access node within said segments, and for segments where said detected signal strength is above a predetermined level, performing precoding operations such that said null signal beam is formed in said segments.

8. A method according to claim 1, wherein said multiple input multiple output network node is operable to transmit signals in both a licensed and an unlicensed band.

9. A method according to claim 1, comprising storing said at least one estimated channel and periodically repeating said step of estimating and in response to detecting changes in said at least one estimated channel updating said precoding operations and storing said updated estimated channel.

10. A multiple input multiple output network node operable to transmit signals in an unlicensed band, and comprising:
    multiple antenna;
    at least one processor; and
    at least one memory including computer program code;
    wherein the at least one memory and the computer program code are configured to, with the at least one processor, cause the multiple input multiple output network node to estimate at least one channel within said unlicensed band between at least one network access node operable to transmit in said unlicensed band and said multiple input multiple output network node;
    wherein the at least one memory and the computer program code are configured to, with the at least one processor, cause the multiple input multiple output network node to generate precoding operations to be performed on signals output by said multiple antenna such that a null signal beam is formed for said at least one estimated channel;
    wherein the at least one memory and the computer program code are configured to, with the at least one processor, cause the multiple input multiple output network node to monitor signals in said unlicensed band received at said multiple antenna and on which said precoding operations have been performed;
    wherein the at least one memory and the computer program code are configured to, with the at least one processor, cause the multiple input multiple output network node to generate and transmit signals from said multiple antenna;
    wherein the at least one memory and the computer program code are configured to, with the at least one processor, cause the multiple input multiple output network node, in response to detecting said unlicensed band to be clear of signals, to transmit signals in said unlicensed band with said null signal beams in place such that no signals are transmitted on said at least one estimated channel.

11. The multiple input multiple output network node according to claim 10, wherein said at least one memory and the computer program code are configured to, with the at least one processor, cause the multiple input multiple output network node, in response to detecting said unlicensed band being used by a network access node not transmit signals in said unlicensed band for a predetermined time, and after said predetermined time to perform said monitoring again.

12. The multiple input multiple output network node according to claim 11, wherein said at least one memory and the computer program code are configured to, with the at least one processor, cause the multiple input multiple output network node, prior performing said monitoring again, to update said precoding operations using updated channel information determined during said monitoring.

13. The multiple input multiple output network node according to claim 10, wherein the at least one memory and the computer program code are configured to, with the at least one processor, cause the multiple input multiple output network node, in conjunction with transmitting signals in the unlicensed band, to perform precoding operations to form a predetermined number of beams, the predetermined number of beams being less than or equal to a number of available degrees of freedom of the multiple input multiple output network node, the beams including said at least one null signal beam corresponding to the at least one estimated channel between the network access node and said multiple input multiple output network node and at least one further beam, to transmit signals on said at least one further beam, and to not transmit signals on said at least one null signal beam.

14. The multiple input multiple output network node according to claim 10, wherein the at least one memory and the computer program code are configured to, with the at least one processor, cause the multiple input multiple output network node to, in conjunction with estimating the at least one channel within the unlicensed band, monitor at least one pilot signal transmitted by said at least one network access node.

15. The multiple input multiple output network node according to claim 14, wherein said at least one pilot signal comprises a pilot signal configured for receipt and decoding by said multiple input multiple output network node.

16. The multiple input multiple output network node according to claim 10, wherein the at least one memory and the computer program code are configured to, with the at least one processor, cause the multiple input multiple output network node, in conjunction with estimating the at least one channel within the unlicensed band, to perform beam sweeping by forming beams in successive segment of a radio coverage area of said multiple input multiple output network node, to monitor a strength of signals transmitted by said at least one network access node within said segments, and, for segments where said detected signal strength is above a predetermined level, to perform precoding operations such that said null signal beam is formed in said segments.

17. The multiple input multiple output network node according to claim 10, wherein the at least one memory and the computer program code are configured to, with the at least one processor, cause the multiple input multiple output network node to transmit signals in both a licensed and an unlicensed band.

18. The multiple input multiple output network node according to claim 10, wherein the at least one memory and the computer program code are configured to, with the at least one processor, cause the multiple input multiple output network node to store said at least one estimated channel and periodically repeat said estimating and, in response to detecting changes in said at least one estimated channel, to update said precoding operations and store said updated estimated channel.

19. A system to facilitate sharing resources in an unlicensed frequency band, the system comprising:
   a multiple input multiple output network node operable to transmit signals in an unlicensed frequency band, the multiple input multiple output network node including:
      multiple antenna;
      at least one processor; and
      at least one memory including computer program code;
      wherein the at least one memory and the computer program code are configured to, with the at least one processor, cause the multiple input multiple output network node to estimate at least one channel within said unlicensed band between at least one network access node operable to transmit in said unlicensed band and said multiple input multiple output network node;
      wherein the at least one memory and the computer program code are configured to, with the at least one processor, cause the multiple input multiple output network node to generate precoding operations to be performed on signals output by said multiple antenna such that a null signal beam is formed for said at least one estimated channel;
      wherein the at least one memory and the computer program are configured to, with the at least one processor, cause the multiple input multiple output network node to monitor signals in said unlicensed band received at said multiple antenna and on which said precoding operations have been performed;
      wherein the at least one memory and the computer program code are configured to, with the at least one processor, cause the mulitple input multiple output network node to generate and transmit signals from said multiple antenna;
      wherein the at least one memory and the computer program code are configured to, with the at least one processor, cause the multiple input multiple output network node, in response to detecting said unlicensed band to be clear of signals, to transmit signals in said unlicensed band with said null signal beams in place such that no signals are transmitted on said at least one estimated channel; and
   a network access node configured to transmit signals in an unlicensed band, said network access node comprising circuitry configured to generate a pilot signal indicative of a channel used by said network access node and to transmit said pilot signal at a time and frequency and in a format suitable for receipt and decoding by the multiple input multiple output network node.

20. A non-transitory computer-readable medium storing program instructions that, when executed by a computer cause a multiple input multiple output network node operable to transmit signals in an unlicensed band to perform a method, comprising:
   estimating at least one channel within said unlicensed band between at least one network access node operable to transmit in said unlicensed band and said multiple input multiple output network node;
   determining precoding operations required to generate a null signal beam for said at least one estimated channel;
   monitoring said unlicensed band using said determined precoding operations; and
   in response to detecting said unlicensed band to be clear of signals, transmitting at least one signal in said unlicensed band with said null signal beam in place such that no signal is transmitted by said multiple input multiple output network node on said at least one estimated channel.

* * * * *